United States Patent
Birkner et al.

(10) Patent No.: US 10,454,776 B2
(45) Date of Patent: Oct. 22, 2019

(54) DYNAMIC COMPUTER NETWORK CLASSIFICATION USING MACHINE LEARNING

(71) Applicant: Cisco Technology, Inc., San Jose, CA (US)

(72) Inventors: Matthew H. Birkner, Apex, NC (US); Robert Piasecki, Seminole, FL (US); Ian Hasund, Cary, NC (US); Cody R. Peeples, Cary, NC (US)

(73) Assignee: Cisco Technologies, Inc., San Jose, CA (US)

( * ) Notice: Subject to any disclaimer, the term of this patent is extended or adjusted under 35 U.S.C. 154(b) by 194 days.

(21) Appl. No.: 15/492,927

(22) Filed: Apr. 20, 2017

(65) Prior Publication Data
US 2018/0309639 A1    Oct. 25, 2018

(51) Int. Cl.
| | | |
|---|---|---|
| *G06F 15/173* | (2006.01) | |
| *H04L 12/24* | (2006.01) | |
| *G06N 20/00* | (2019.01) | |
| *H04L 12/26* | (2006.01) | |

(52) U.S. Cl.
CPC ............ *H04L 41/14* (2013.01); *G06N 20/00* (2019.01); *H04L 41/16* (2013.01); *H04L 41/0893* (2013.01); *H04L 43/08* (2013.01); *H04L 43/16* (2013.01)

(58) Field of Classification Search
CPC ... G06N 99/005; H04L 41/0893; H04L 41/14; H04L 41/16; H04L 43/08; H04L 43/16
USPC ........................................ 709/223, 225, 231
See application file for complete search history.

(56) References Cited

U.S. PATENT DOCUMENTS

| | | | |
|---|---|---|---|
| 9,258,217 B2 | 2/2016 | Duffield et al. | |
| 2008/0082352 A1* | 4/2008 | Schmidtler | G06Q 10/10 705/2 |
| 2008/0086433 A1* | 4/2008 | Schmidtler | G06F 17/30707 706/12 |
| 2010/0174670 A1* | 7/2010 | Malik | G06F 17/30705 706/12 |
| 2013/0138641 A1* | 5/2013 | Korolev | G06F 17/2785 707/730 |
| 2014/0165207 A1 | 6/2014 | Engel et al. | |

(Continued)

FOREIGN PATENT DOCUMENTS

CN          104883278 A        9/2015

OTHER PUBLICATIONS

International Search Report and Written Opinion dated Jun. 29, 2018 in connection with PCT/US2018/027023.

(Continued)

*Primary Examiner* — Phuoc H Nguyen
(74) *Attorney, Agent, or Firm* — Behmke Innovation Group LLC; James M. Behmke; Stephen D. LeBarron (57) ABSTRACT

In one embodiment, a computing device maintains a component list of a plurality of measurable computer network characteristics for a plurality of computer networks, and assigns a component weighting factor to each characteristic within the component list. The computing device may then adjust the component weighting factor within the component list for each particular characteristic over time based at least in part on a measurable effect that particular network characteristic has over one or more of the plurality of computer networks in response to a change to that particular characteristic.

20 Claims, 10 Drawing Sheets

(56) References Cited

U.S. PATENT DOCUMENTS

| | | |
|---|---|---|
| 2014/0283079 A1 | 9/2014 | Xaypanya et al. |
| 2016/0094477 A1* | 3/2016 | Bai ................... H04L 47/786 709/226 |
| 2016/0253597 A1* | 9/2016 | Bhatt .................. G06N 99/005 706/12 |
| 2016/0275289 A1 | 9/2016 | Sethumadhavan et al. |
| 2016/0275414 A1* | 9/2016 | Towal ................. G06F 17/3028 |
| 2017/0177997 A1* | 6/2017 | Karlinsky ............. G06N 3/08 |
| 2018/0239658 A1* | 8/2018 | Whitner ............... G06F 11/004 |

OTHER PUBLICATIONS

Da F Costa, L. et al.: "A pattern recognition approach to complex networks", Journal of Statistical Mechanics: Theory and Experiment, Institute of Physics Publishing, Bristol, GB, vol. 2010, No. 11, Nov. 9, 2010.

Marnerides, A.K. et al.: "Traffic anomaly diagnosis in Internet backbone networks: A survey", Computer Networks, Elsevier, Amsterdam, NL, vol. 73, Aug. 23, 2014.

OSullivan, A. et al.: "Canonical Correlation Analysis for Detecting Changes in Network Structures", Data Mining Workshops (ICDMW), 2012 IEEE 12th International Conference on, IEEE, Dec. 10, 2012.

Ahmed, N.K. et al.: "Graphlet decomposition: framework, algorithms, and applications", Knowledge and Information Systems, Springer Verlag, London, GB, vol. 50, No. 3, Jun. 27, 2016.

Meyer, David., "Naive Bayes Classifier", http://ugrad.stat.ubc.ca/R/library/e1071/html/naiveBayes.html, 2 pages, Accessed Dec. 15, 2016, The University of British Columbia.

* cited by examiner

| NUMBER 305 | PRIMARY COMPONENT CATEGORY 310 | SECONDARY COMPONENT NAME 315 | TIME 320 | COMPONENT WEIGHTING FACTOR (CWF) 325 |
|---|---|---|---|---|
| 1 | Device_Detail | Component_1 (e.g., Software version) | Epoch Time of Measurement | Value X |
| 2 | Performance | Component_2 (e.g., Count of BGP table flaps) | Epoch Time of Measurement | Value X |
| ... | Fault | ... | ... | ... |
| N | Capacity | Component_N (e.g., Average CPU) | Epoch Time of Measurement | Value X |

| NUMBER 305 | PRIMARY COMPONENT CATEGORY 310 | SECONDARY COMPONENT NAME 315 | TIME 320 | COMPONENT WEIGHTING FACTOR (CWF) 325 |
|---|---|---|---|---|
| 1 | Device_Detail | Component_1 (e.g., Software version) | Epoch Time of Measurement | Existing CWF +/- adjustment factor 710 |
| 2 | Performance | Component_2 (e.g., Count of BGP table flaps) | Epoch Time of Measurement | Value X (no change) New CWF = old CWF |
| ... | Fault | ... | ... | ... |
| N | Capacity | Component_N (e.g., Average CPU) | Epoch Time of Measurement | Existing CWF +/- adjustment factor 710 |

DYNAMIC COMPUTER NETWORK CLASSIFICATION USING MACHINE LEARNING

TECHNICAL FIELD

The present disclosure relates generally to computer networks, and, more particularly, to dynamic computer network classification using machine learning.

BACKGROUND

Computer networks are ever-changing systems that are very difficult to classify as they grow, shrink, or otherwise change. In order to assist in troubleshooting of a network, design of a new network, or review of a current network, network engineers often rely on word of mouth to determine what other networks are "similar" to the network that they are analyzing. Once they find a similar network, they can ask those engineers that support the similar network for help or advice, for example. One problem with this approach is that this effort can take a large amount of time and often misses many potential connections. Another problem with this approach is that a solution often depends on a number of potential non-obvious inputs. As a result of these and other challenges, many network engineers repeat the same work and research, for nearly every incident.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computing device maintains a component list of a plurality of measurable computer network characteristics for a plurality of computer networks, and assigns a component weighting factor to each characteristic within the component list. The computing device may then adjust the component weighting factor within the component list for each particular characteristic over time based at least in part on a measurable effect that particular network characteristic has over one or more of the plurality of computer networks in response to a change to that particular characteristic.

According to one or more additional embodiments of the disclosure, the plurality of computer networks may be classified into groups of similar computer networks based on the component list and component weighting factors (e.g., for troubleshooting). Alternatively or in addition, a ranking of the characteristics within the component list may be determined according to associated component weighting factors. Note also that according to one or more additional embodiments of the disclosure, characteristics may be added to or removed from the component list over time.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

Figure 1A:
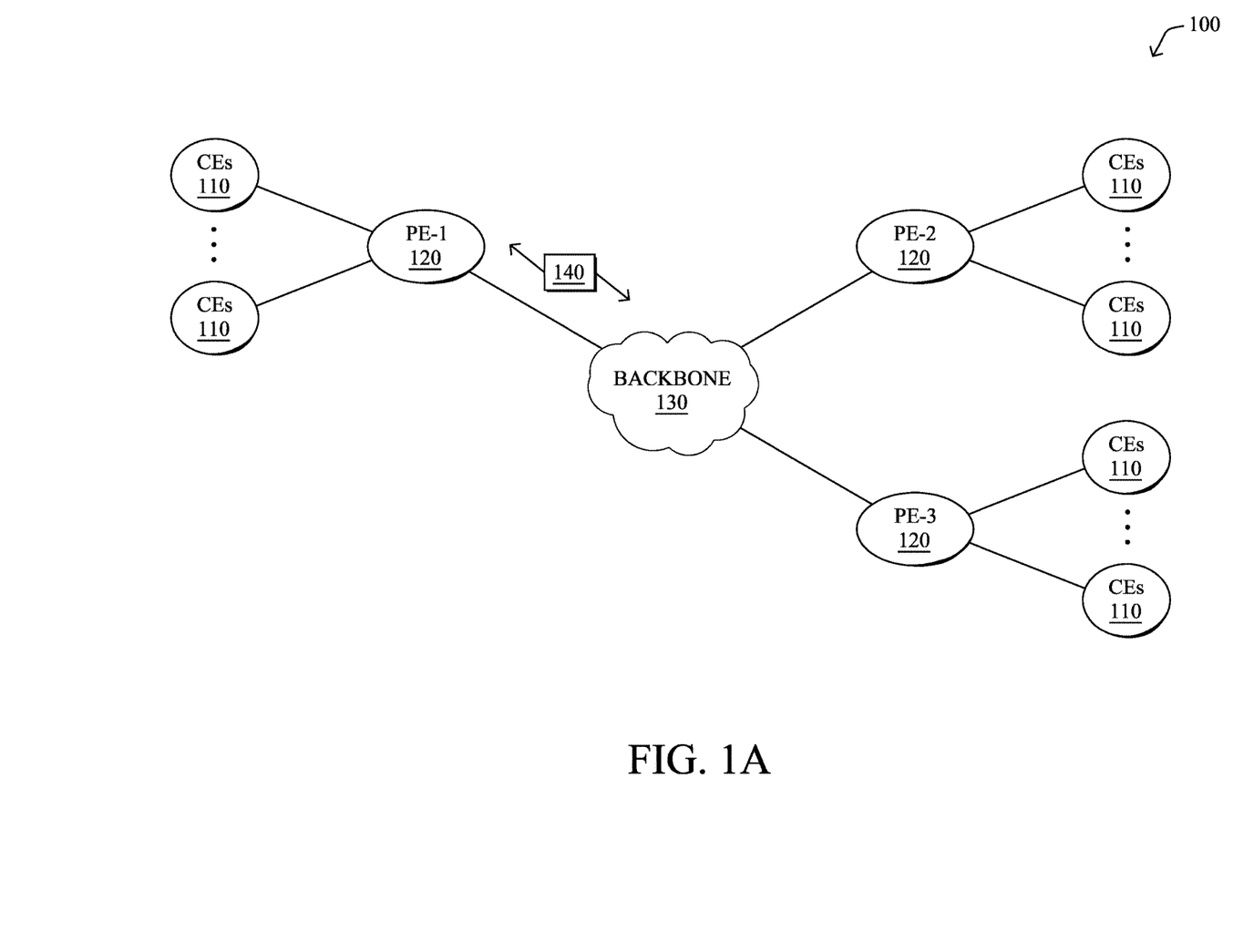
FIGS. 1A-1B illustrate example computer networks.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
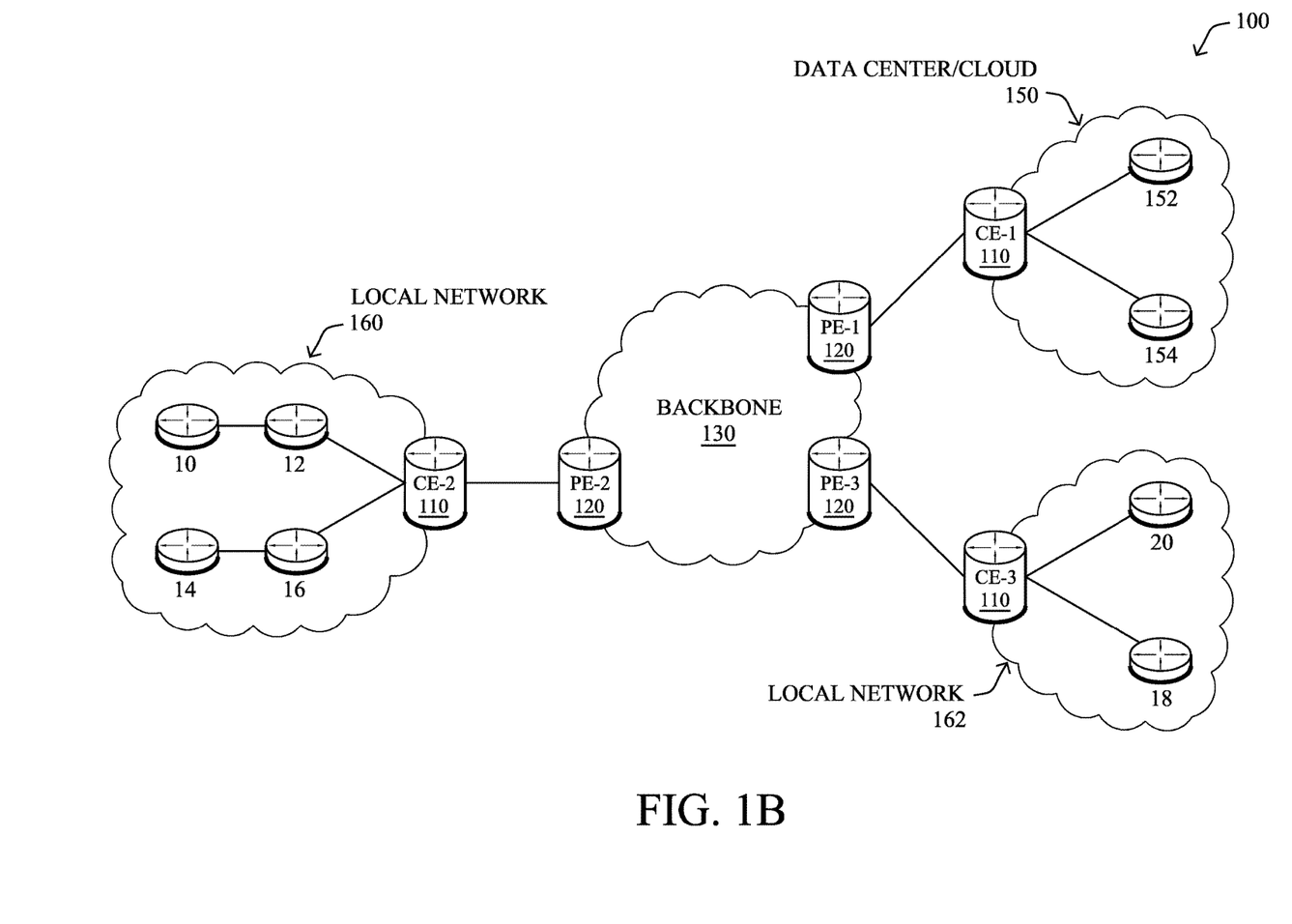

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
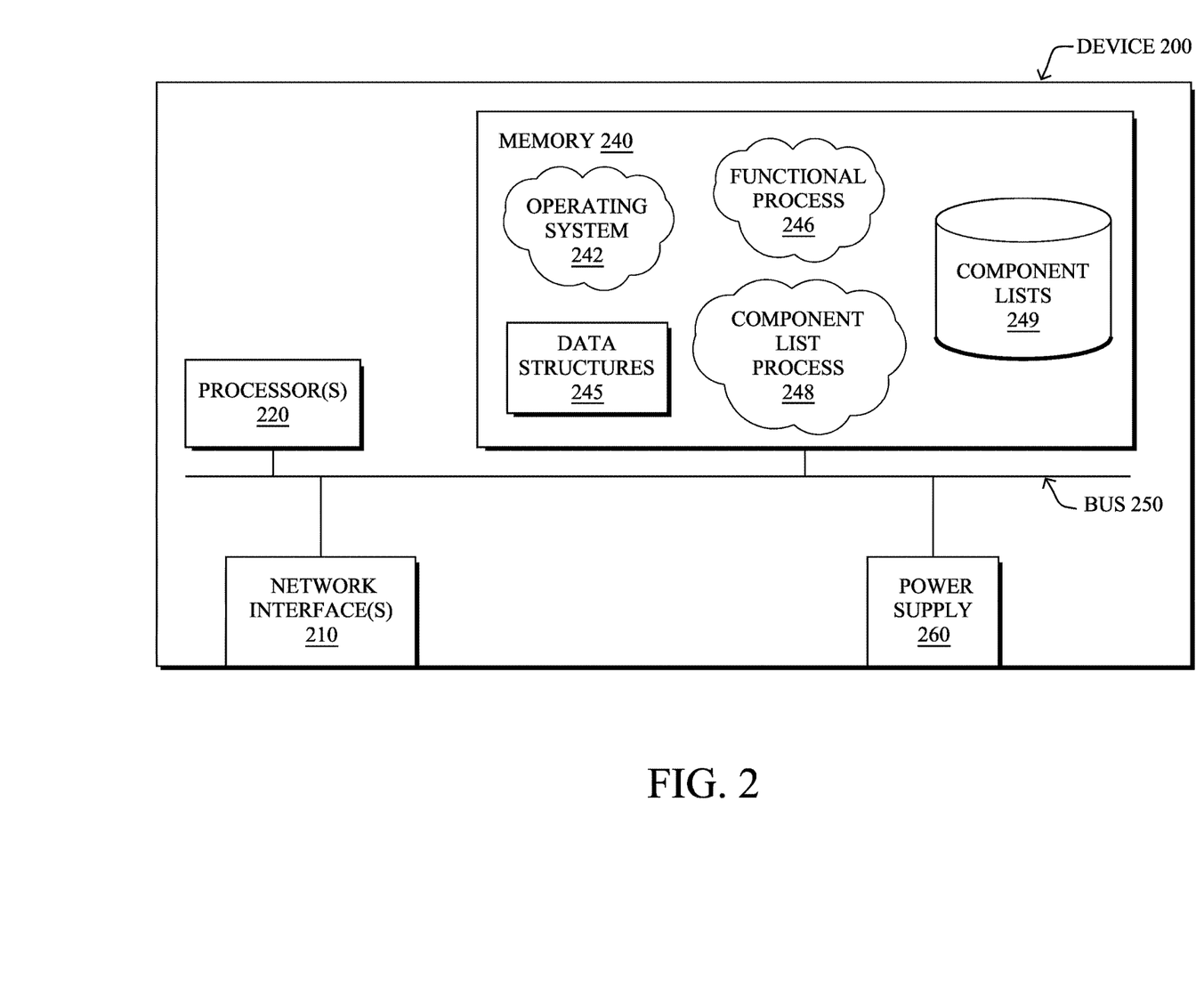
FIG. 2 illustrates an example network device/node.

FIG. 2 is a schematic block diagram of an example computing device 200 that may be used with one or more embodiments described herein e.g., as any of the devices shown in FIG. 1 above, and particularly as specific devices as described further below (e.g., servers, centralized devices, distributed processes, cloud resources, and so on) or any other computing device with access to the operations of network. The device 200 may also be any other suitable type of device depending upon the type of network architecture in place, such as IoT nodes, etc. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245 (such as component list database 249, described below). An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "component list" process 248, as described herein. Notably, functional processes 246, when executed by processor(s) 220, cause each particular device 200 to perform the various functions corresponding to the particular device's purpose and general configuration. For example, a server would be configured to operate as a server, a router would be configured to operate as a router, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments as described below, the illustrative component list process 248 may utilize machine learning techniques to perform various aspects of the techniques described below. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

One class of machine learning techniques that is of particular use in the context of the techniques herein is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

—Dynamic Computer Network Classification Using Machine Learning—

As noted above, computer networks are ever-changing systems that are very difficult to classify. Solutions often depend on a number of known inputs, but more often than not depend further on potential non-obvious inputs, such as platform, software, versions, features, scale, and so on. Since there are essentially an infinite number of parameters that can be associated with a network of devices, there is currently no feasible way (due to compute time and current time constraints) to model or classify all components in any reasonable timeframe. In particular, it is critical that the time to compute such a model will not allow too much time to have passed, otherwise the model very likely is no longer relevant because certain components have changed.

The techniques herein, therefore, automatically and dynamically draw comparisons between networks through intelligent classification in order to determine which other networks have similar characteristics, at any point in time, thus accelerating resolution and improving customer satisfaction. In particular, the techniques herein create and dynamically refine and adjust a time-based, weighted component list of the most relevant components that characterize a network (for any timeframe). These refined components can be used as inputs to any classification or troubleshooting algorithms, where, as described herein, the weight of components may be dynamically adjusted, and components can be added or removed over time.

Specifically, according to one or more embodiments of the disclosure as described in detail below, the techniques herein create a component list (CL), and use machine-learning techniques to dynamically change the weights of components in the CL to introduce bias and intelligence to the CL, and thus any other system or algorithm that uses the CL as input. In essence, the techniques herein decide that some components are more relevant than others. In one embodiment, the CL changes dynamically based on a weighting factor, and also may be expanded for new entries (e.g., through a candidate process) or reduced by removal of less relevant entries.

Illustratively, the techniques described herein may be performed by hardware, software, and/or firmware, such as in accordance with the "component list" process 248, which may include computer executable instructions executed by the processor 220 to perform functions relating to the techniques described herein. Generally, the process 248 may be executed on any suitable network device, such as a server (e.g., local, distributed, cloud-based, etc.), or other device with appropriate visibility, connectivity, and authority.

A component, as defined herein, is any data category that is measurable (i.e., a "measurable characteristic") in a computer network. In the network domain, an example of a network component could be router CPU utilization value (e.g., 20%), or the count of a Syslog Mnemonic value (e.g., OSPF-ADJ-CHANGE count=1034). Other components could be hardware version, software version, features, geo-location coordinates, scale numbers, number of ports, number of users, protocols used, number of neighbors, and so on. Essentially, the number of potential components (characteristics) of a network is quite large, and those listed herein are merely examples.

Figure 3:
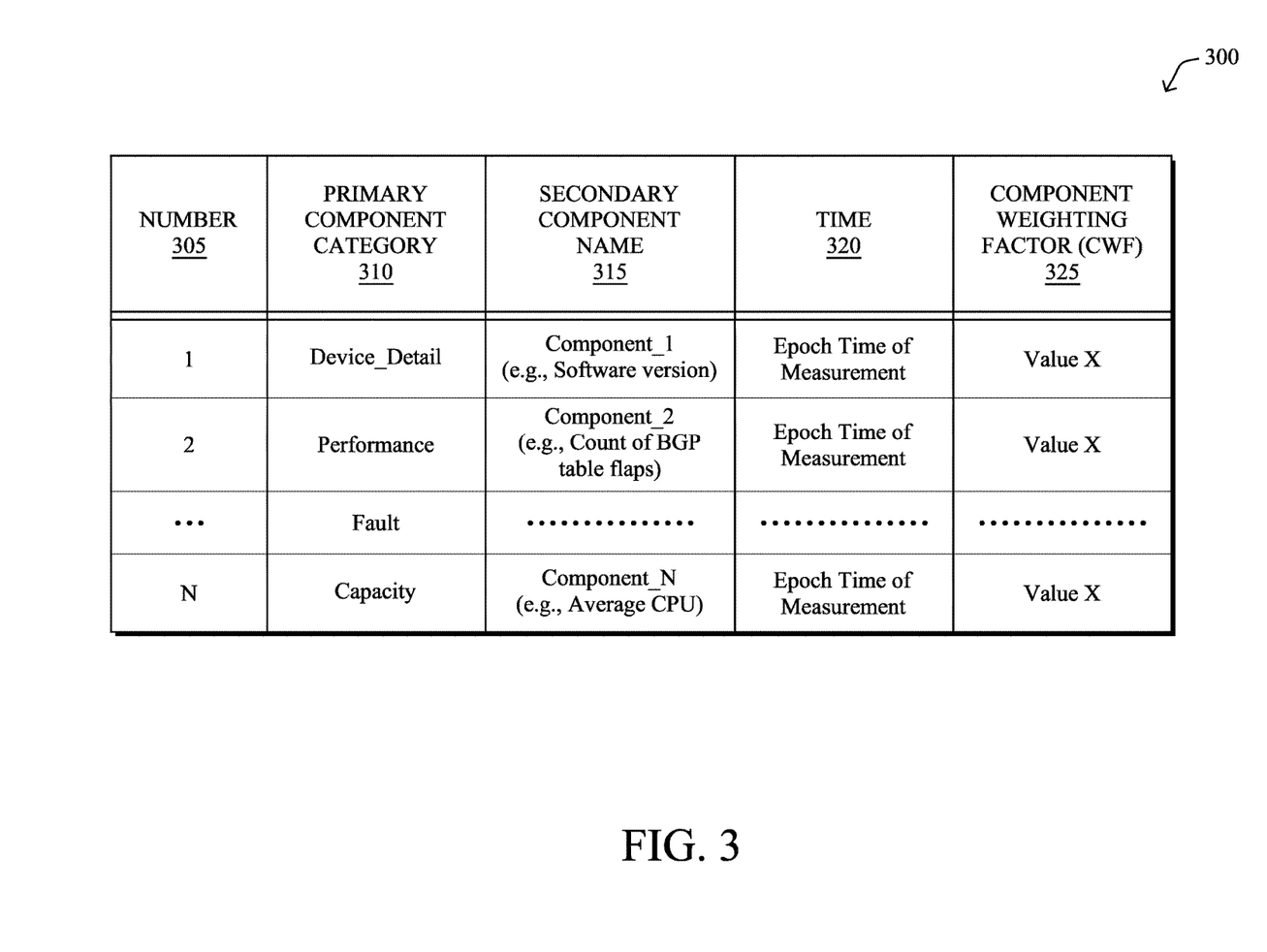
FIG. 3 illustrates an example component list.

FIG. 3 illustrates an example component list (CL) 300 (e.g., stored in structure 249 of device 200). Note that any table or list format may be used, and CL 300 is merely one illustrative example that is not meant to be limiting to the scope of the embodiments herein. CL 300 may comprise any number of entries 305, where each entry has a primary component category 310 and secondary component category 315, the time observed 320, and a component weighting factor (CWF) 325.

A primary category (PC) 310 is a high level of classification, such as Device Details, Performance, Capacity, Fault, Topology, and so on. A PC can be weighted with a value to signify importance. For example, the PC for Capacity may be marked more relevant than Performance for some comparisons/situations. A secondary category (SC) 315 (or sub-category), on the other hand, is a more granular level of classification, such as router CPU, which, for example, is within the Device Details primary category (PC), or link utilization, which would fall under the Capacity primary category. Other categories will be readily apparent to those skilled in the art, and any may be configured for or determined by the techniques herein. For example, a primary category for "Network Protocol" may be made up of many secondary categories, such as BPG, IGP, MPLS, 802.11 wireless, etc., while a primary category of Performance may have secondary categories such as average latency, max latency, number of BGP flaps, etc.

A Component Weighting Factor (CWF) 325 is a metric that is used to provide bias to the compared components, thus indicating a greater or lesser relevance or importance than other components. For example, in one embodiment, the CWF may be a hashed value based on, e.g., delta values of a component, its PC and SC weights, time frame (epoch-time), and number of devices in the sample set that have similar change parameters. In this manner, the CWF allows the techniques herein to add intelligent bias to the classification model, and is thus appended to each component in a CL 300. In one embodiment, the timeframe 320 is also an essential variable as changes that occur in a network "today" may be considered to be more relevant than those that occurred a longer time ago.

Note that a candidate component list (CCL) is structurally similar to the CL 300, which as described below, may be the first step in how new components are introduced and evaluated. For instance, as detailed below, if the CCL elements are deemed significant, then those particular (significant) entries can be promoted to the CL 300 with their own CWF 325, just as CL values do.

Figure 4:
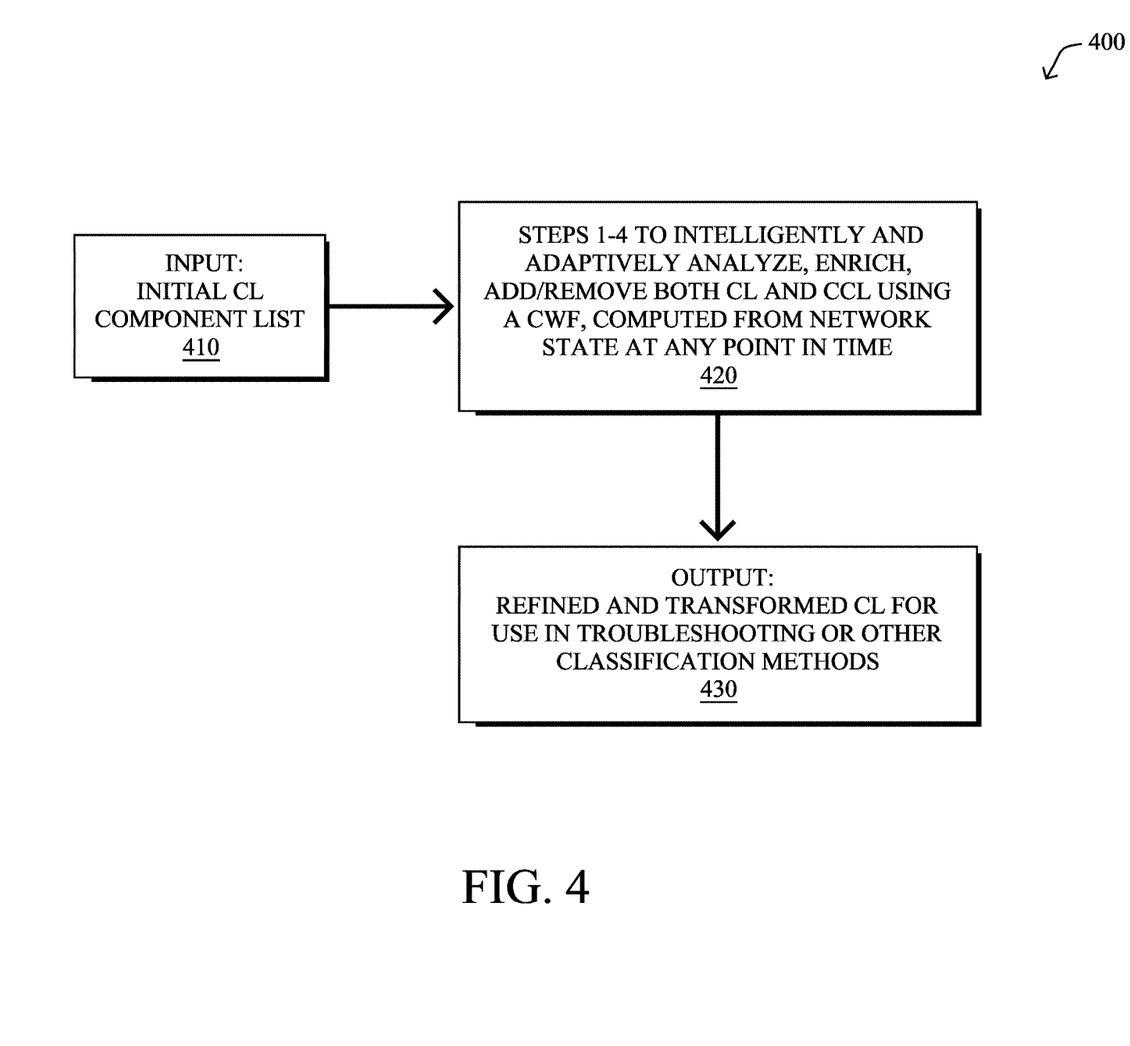
FIG. 4 illustrates an example flow diagram for managing a component list.

Operationally, and with reference to the simplified flow diagram 400 of FIG. 4, a high-level illustration of the techniques herein may be described in terms of an input 410 (i.e., an initial component list 300), an iterative and intelligent process 420 (e.g., steps "1-4" below to intelligently and adaptively analyze, enrich, add/remove both CL entries and CCL entries using a CWF, computed from network state at any point in time), and an output 430 (namely, a refined and transformed CL 300 for use in troubleshooting or other classification methods). Note that steps 1-4 need not be performed in any particular order, and are merely labelled for illustration (e.g., in particular, step 4 may occur in parallel with either step 2 or step 3, and so on).

—Step 1: Initial Classification—

Figure 5:
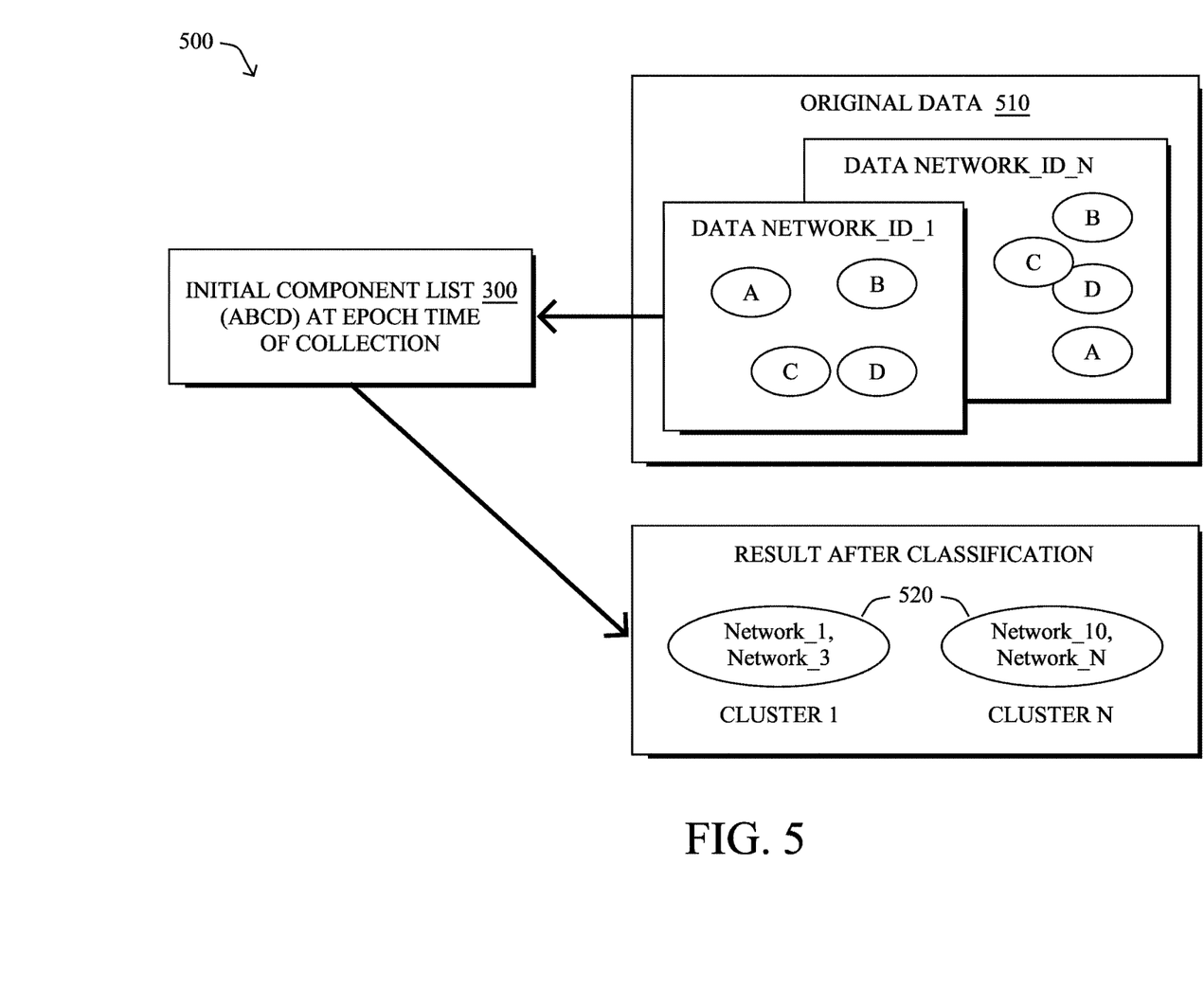
FIG. 5 illustrates an example of an initial classification based on a component list.

With reference to the representation 500 shown in FIG. 5, the techniques herein may start with an initial component list 300 (e.g., including components A, B, C, and D) at epoch time of collection. With this initial list applied to data 510 from the networks, classification methods (e.g., randomForest, etc.) may be used to cluster the same normalized list of components by Network_ID, e.g., assuming that all component weights 325 in the component list 300 are equal (or at least at their initialized and unadjusted value). An example result after classification may be that Network_1 and Network_3 are similar (Cluster 1), whereas Network_10 and Network_N are also similar (Cluster N).

—Step 2: Poll and Create a CWF for the Initial Component List, Perform Biased Classification to Build a New, More Intelligent Model—

Figure 6:
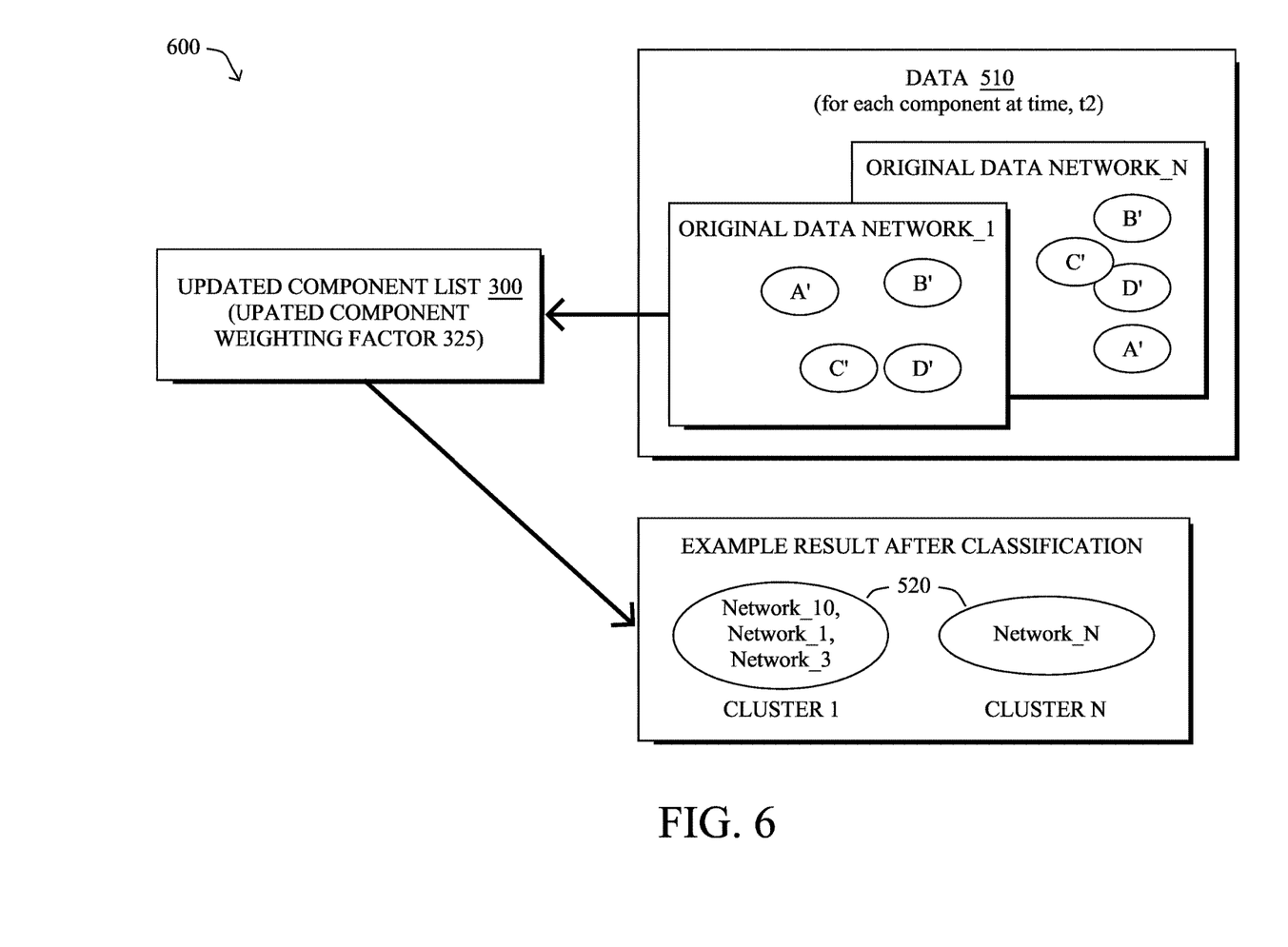
FIG. 6 illustrates an example of updating the classification based on an updated component list.

With reference to representation 600 of FIG. 6, the next illustrative step of an example embodiment herein is to poll or otherwise gather the component measurement data from each device in all networks with the component list that was defined in Step 1 (e.g., A', B', C', and D'). The deltas of each component may then be computed and normalized into a CWF Adjustment Factor (CAF). Illustratively, elements that make the CAF may comprise the magnitude of change, the number of devices changing, and time delta between polls with more recent changes getting a boost, as well as the weight of a the primary and secondary component categories. Each of these values may then be hashed together to create the CAF.

Figure 7:
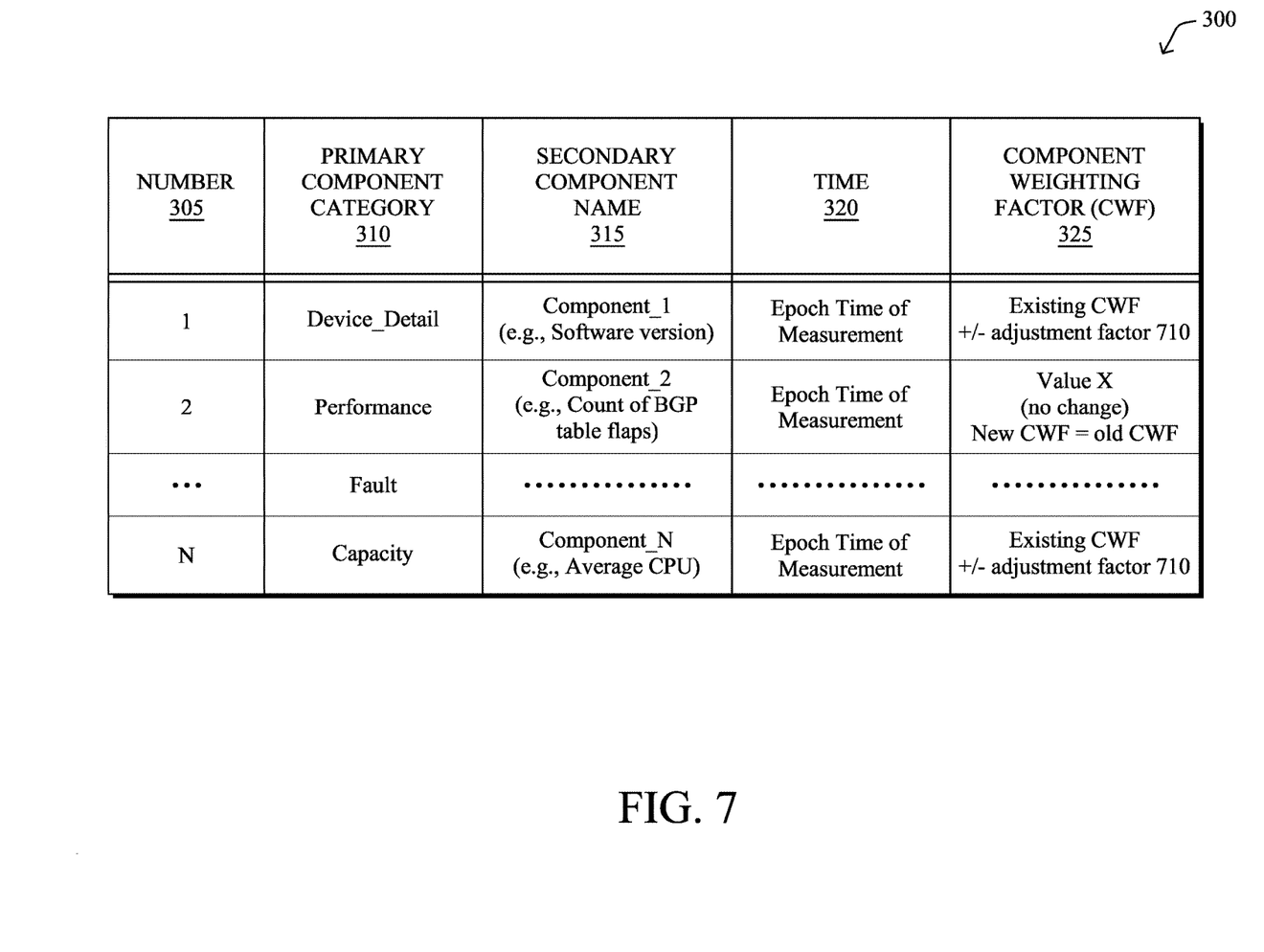
FIG. 7 illustrates an example updated component list.

As shown in FIG. 7, referring to an updated version of component list 300, the CWF of each original component may then be adjusted (e.g., increased, or decreased, left alone) according to this CAF 710. With this newly adjusted list of components, bases on the adjusted CWF values 325, classification may again be performed based on not only the components but also the updated weighting factors of each component. For instance, referring back to FIG. 6, since bias has been introduced to the component list (and because the data values may have changed), the clusters may be different than those in step 1 above, namely Network_10 may now be a part of Cluster 1 with Network_1 and Network_3.

—Step 3: Ongoing Component List Refinement—

In this illustrative step, step 2 above may be repeated on a periodic basis to create an updated list of similar networks based on the component list(s), accordingly.

Step 4: Adding or Removing Components—

Figure 8:
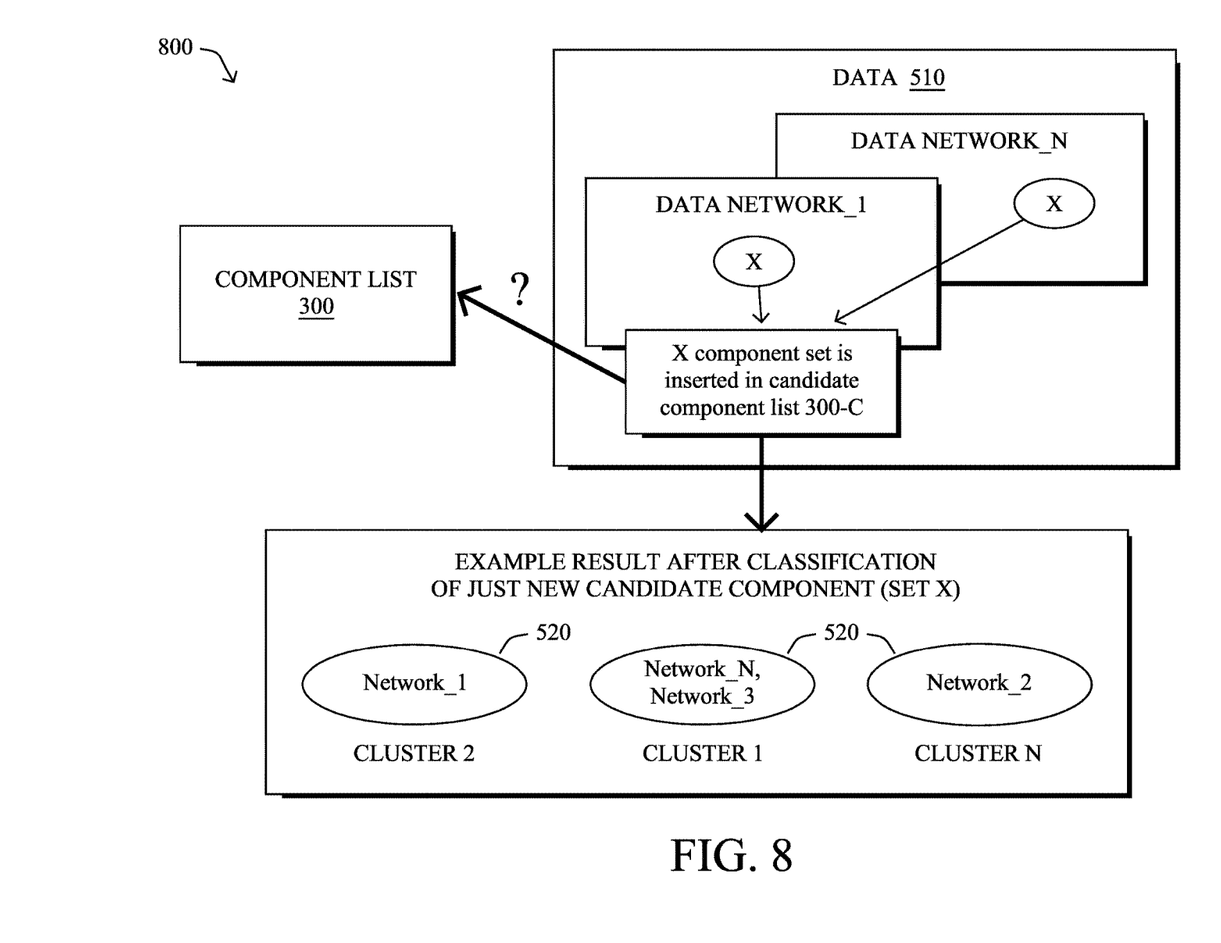
FIG. 8 illustrates an example of a candidate component list.

With reference now to representation 800 of FIG. 8, assume that a new candidate component "X" (or set X) is either detected or inserted to the analysis system. For example, new components may be established based on human entry, or else based on one or more machine learning techniques (e.g., trial and error, random selection, detection of new configuration changes, etc.). An example of a new component as shown in FIG. 8 may be "BGP_MAX_PREFIX Error Message", which may be placed into the candidate component list (CCL) "300-C". As before, deltas based on time, magnitude, and device count may be computed to set a dynamic weight (CWF 325). FIG. 8 specifically illustrates that Component X may be classified and clustered independently by Network_ID, such that an example clustering might be Cluster 1 having Network_3 and Network_N, Cluster 2 having Network_1, and Cluster 3 having Network_2, as shown.

According to an illustrative embodiment of step 4 herein, a "candidate component list algorithm" may then be executed. In particular, one example CCL algorithm may be to simply compare the CWF of the new component, adjusted over time, to the CWFs 325 of the component list 300. If the CWF reaches some defined threshold (i.e., is deemed significant in view of the other components/characteristics in the list), then the candidate component may be added. Said differently, in one example embodiment, new characteristics may first be added to a candidate component list, where a component weighting factor may be assigned to the new characteristics within the candidate component list. After adjusting the component weighting factor within the candidate component list over time, a new characteristic may be added to the candidate list once the component weighting factor for that particular new characteristic is above a threshold. (Similarly, if a component/characteristic has a CWF that falls below a threshold, then that component may be correspondingly removed from the component list 300.)

In an alternative example CCL algorithm, once the new component (X) is initially clustered, the techniques herein may run the CCL algorithm described below to determine if the new component (from candidate component list 300-C) should be promoted to the component list (CL) 300. Specifically, this alternative example CCL algorithm may first comprise inputting a new candidate component X to the system, i.e., into the candidate component list 300-C. The new component's (X's) deltas may then be computed (similar to step 2 above, but only on the new component (X)). Classification may then be performed in order to group the new component X into network clusters that all have devices with common X delta values, time, and magnitude (as in step 2). For each CCL network grouping (cluster), device/cluster lists are then computed, which can be compared against a device/cluster lists for each cluster greater by the CL; if there are enough common elements between CCL clusters and the CL clusters (e.g., defined as a threshold percentage or otherwise), then the CCL X value will be promoted for inclusion in the CL, e.g., with a default CWF. If there are not enough common elements, then the candidate component is not promoted and optionally removed from the CCL.

—Closing Remarks—

Figure 9:
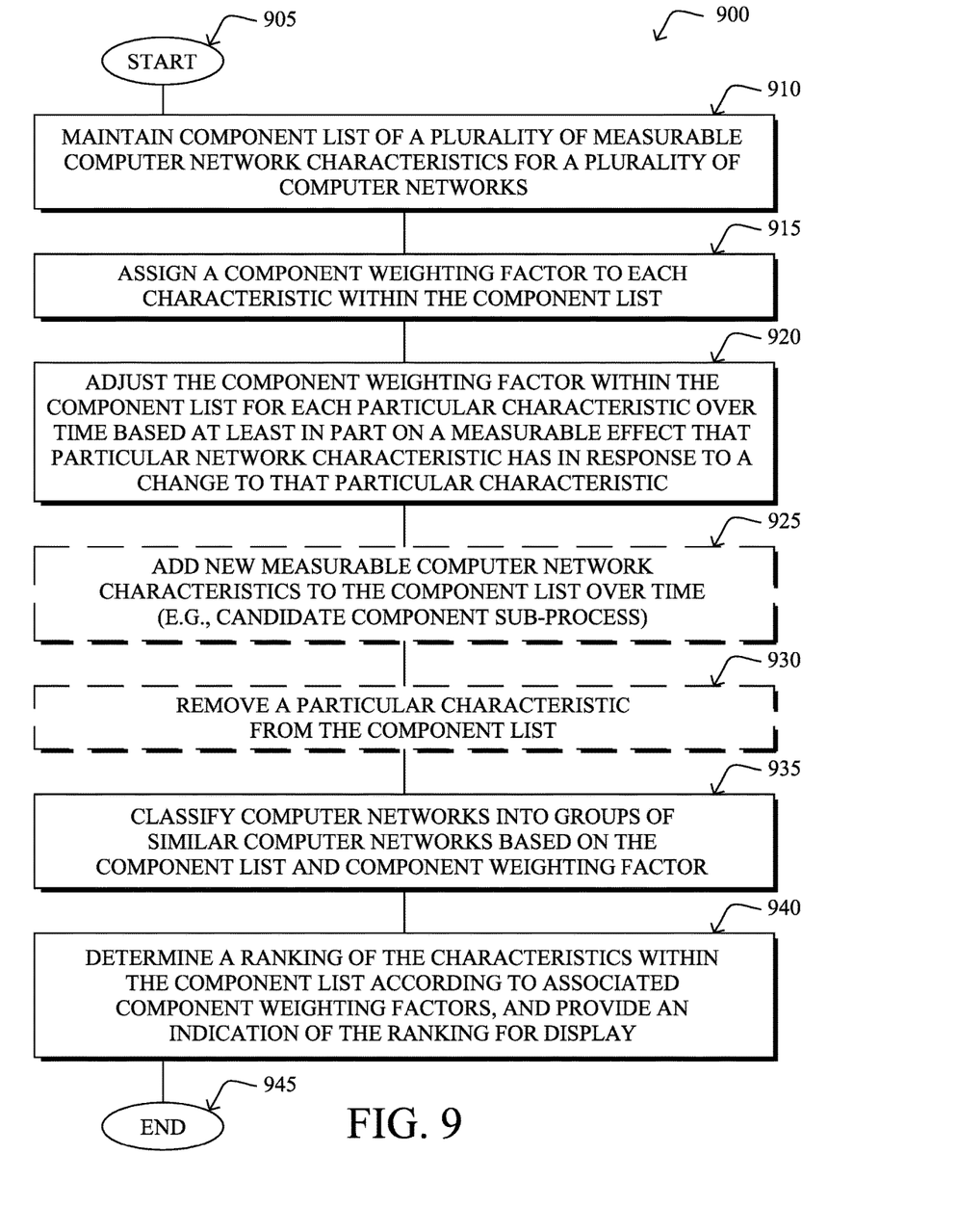
FIG. 9 illustrates an example simplified procedure for dynamic computer network classification using machine learning in a network.

FIG. 9 illustrates an example simplified procedure for dynamic computer network classification using machine learning in a network in accordance with one or more embodiments described herein. For example, a non-generic, specifically configured device (e.g., device 200) may perform procedure 900 by executing stored instructions (e.g., process 248). The procedure 900 may start at step 905, and continues to step 910, where, as described in greater detail above, a computing device 200 (e.g., a network server) maintains a component list (CL) 300 of a plurality of measurable computer network characteristics (components) for a plurality of computer networks. For instance, as described above, each of the characteristics within the component list may be associated with a corresponding primary category (PC) 310 and a corresponding secondary category (SC) 315 within the primary category. As described above, the secondary category for each of the characteristics may generally have a greater effect on the corresponding component weighting factor 325 for that characteristic than the primary category for that characteristic.

In step 915, the computing device assigns a component weighting factor (CWF) 325 to each characteristic within the component list, such as through manual input, default values, or more intelligent pre-establishment of an initialized value. Accordingly, in step 920, the computing device may adjust the component weighting factor within the component list for each particular characteristic over time. For instance, as detailed above, the adjustment (e.g., CWF adjustment factor) may be based at least in part on a measurable effect that particular network characteristic has over the computer networks in response to a change to that particular characteristic. For example, this may be based on any one more of: a magnitude of the measurable effect, a number of devices affected by the change, a time of the change, and a primary category (and optionally secondary category) of the particular characteristic. The adjustment may also be based on how recently an associated network characteristic has changed or otherwise been added to the component list.

Optionally, in step 925, new measurable computer network characteristics may be added to the component list over time. As shown above, the techniques herein may select new characteristics to add to the component list based on a manual entry or based on a dynamic machine-learning-based determination. Though in one embodiment, the new characteristics may be added directly to the component list, alternative embodiments, such as those mentioned above, may provide that a candidate component list algorithm be used first (e.g., thresholds, cluster comparisons, etc.), in order to determine the applicability and value of the new characteristic before using it in the candidate list. Also as an option, as noted above, in step 930 the techniques herein may remove a particular characteristic from the component list, e.g., once the component weighting factor for that particular characteristic is below a threshold, or for other reasons (e.g., manually, machine-learning-based determinations, etc.).

In step 935, a plurality of computer networks may be classified into groups of similar computer networks based on the component list and component weighting factor for each characteristic within the component list. For example, this clustering may be used for troubleshooting a particular computer network based on comparisons to one or more similar computer networks (e.g., in the same cluster; that is, within of a same "group" as the particular computer network). Also, various "match making" of resources may occur based on the clustering, such as connecting network engineers to other "experts" that have had experience with the same type of network profile.

Note that the classifications made herein are based on periods of time. As such, each of the "computer networks" classified may correspond to a computer network configuration at a specific period of time. In other words, it is possible for the techniques herein to classify Network_N of today against Network_M of a year ago, or may determine that Network_X planned for activation next year is similar to a Network_Y of two years past. Other time-based examples are of course possible, and those mentioned are merely to demonstrate the capabilities of the techniques herein.

In another embodiment of the techniques herein, and referenced by step 940, the computing device may also determine a ranking of the characteristics within the component list according to associated component weighting factors, and may provide an indication of the ranking for display. Said differently, a network engineer may be interested in learning what are the most important or relevant characteristics that can be used to compare networks. For example it may be determined that one of the biggest factors of network behavior (i.e., a characteristic with the largest component weighting factors) is available link bandwidth, more so than available CPU processing capacity. As such, resources may be spent increasing link bandwidth, more so than increasing CPU processing.

The simplified example procedure 900 may illustratively end in step 945, but it is important to note that the iterative nature of the procedure provides that any of the steps above may be repeated, skipped, iterated, performed in different order, etc. For example, adjusting the weighting factor occurs over time, as do adding or removing characteristics from the component list. That is, it should be specifically noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for dynamic computer network classification using machine learning. In particular, the techniques herein determine what aspects of a computer network to use when comparing networks based on which of those aspects affect the network the most. That is, the techniques herein provide a dynamic system that updates itself as networks evolve, applying an adjustable weight to components, which can be added and/or removed over time. As such, there is minimal (or even no) human intervention needed to determine similar types of networks, and minimal reliance on human knowledge or legacy relationships. Additionally, the techniques herein provide valuable insight into computer networks, particularly for things such as network design, product engineering (e.g., development and placement), benchmarking services, or even sales (e.g., opportunities to upgrade/sell products).

While there have been shown and described illustrative embodiments that provide for dynamic computer network classification using machine learning, it is to be understood that various other adaptations and modifications may be made within the scope of the embodiments herein. For example, while certain embodiments are described herein with respect to using certain components, weight-changing factors, list formats, and so on, the techniques herein are not limited as such and may be used with other specific configurations. In addition, while certain network types are shown, such as, LANs and WANs, the techniques herein are applicable to any type of computer network, such as Internet of Things (IoT) networks, ad-hoc networks, mobile networks, peer-to-peer networks, and so on, as well as any combination thereof. Moreover, while the description above uses an example where secondary component categories are used, the techniques herein may also be applied to generate and adjust a CWF for the primary categories as well, such as to describe all networks that exhibit the same/similar Performance Characteristics, etc. Furthermore, the techniques above may be used as the back-end for one or more suitable user-interface front-ends, such as affording a user the ability to search for similar networks based on BOOLEAN searches (e.g., components A AND B AND C, and NOT D) that produce clusters over time, or to search for components that result in fewer overlap (e.g., components A, B, and C result in 90% overlapping in clusters, but there is much less overlap between those networks when clustering based on component D, so show clusters based on D in order to better refine the search).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining, by a computing device, a component list of a plurality of measurable computer network characteristics for a plurality of computer networks;
   assigning, by a machine learning process executing on the computing device, a component weighting factor to each characteristic within the component list; and
   dynamically adjusting, by the machine learning process executing on the computing device, the component weighting factor within the component list for each particular characteristic over time based at least in part on a measurable effect that particular network characteristic has over one or more networks of the plurality of computer networks in response to a change to that particular characteristic, wherein a resulting adjusted weighted component list is the most relevant components that characterize the one or more networks of the plurality of computer networks at a given point in time.

2. The method as in claim 1, further comprising:
   adding new measurable computer network characteristics to the component list over time.

3. The method as in claim 2, wherein adding comprises:
   adding the new characteristics to a candidate component list;
   assigning a component weighting factor to the new characteristics within the candidate component list;
   adjusting the component weighting factor within the candidate component list over time; and
   adding a particular new characteristic to the candidate list once the component weighting factor for that particular new characteristic is above a threshold.

4. The method as in claim 2, further comprising:
   selecting the new characteristics to add to the component list based on a dynamic machine-learning-based determination.

5. The method as in claim 1, wherein the component weighting factor is based further on how recently an associated network characteristic has been added to the component list.

6. The method as in claim 1, further comprising:
   removing a particular characteristic from the component list once the component weighting factor for that particular characteristic is below a threshold.

7. The method as in claim 1, further comprising:
   associating each of the characteristics within the component list with a corresponding primary category and a corresponding secondary category within the primary category, wherein the secondary category for each of the characteristics has a greater effect on the corresponding component weighting factor for that characteristic than the primary category for that characteristic.

8. The method as in claim 7, wherein primary categories are selected from a group consisting of: device; performance; capacity; fault; and topology.

9. The method as in claim 1, further comprising:
   classifying the plurality of computer networks into groups of similar computer networks based on the component list and component weighting factor for each characteristic within the component list.

10. The method as in claim 9, further comprising:
    troubleshooting a particular computer network based on comparisons to one or more similar computer networks of a group of the particular computer network.

11. The method as in claim 9, wherein each of the computer networks of the plurality of computer networks corresponds to a computer network configuration at a specific period of time.

12. The method as in claim 1, further comprising:
    determining a ranking of the characteristics within the component list according to associated component weighting factors; and
    providing an indication of the ranking for display.

13. The method as in claim 1, wherein the component weighting factor is based on one or more of: a magnitude of the measurable effect, a number of devices affected by the change, a time of the change, and a primary category of the particular characteristic.

14. The method as in claim 1, wherein assigning the component weighting factor to each characteristic within the component list comprises manual input.

15. A tangible, non-transitory, computer-readable medium storing program instructions that cause a computer to execute a process comprising:
   maintaining a component list of a plurality of measurable computer network characteristics for a plurality of computer networks;
   assigning, by a machine learning process executing on the computer, a component weighting factor to each characteristic within the component list; and
   dynamically adjusting, by the machine learning process, the component weighting factor within the component list for each particular characteristic over time based at least in part on a measurable effect that particular network characteristic has over one or more networks of the plurality of computer networks in response to a change to that particular characteristic, wherein a resulting adjusted weighted component list is the most relevant components that characterize the one or more networks of the plurality of computer networks at a given point in time.

16. The computer-readable medium as in claim 15, wherein the process further comprises:
   adding new measurable computer network characteristics to the component list over time; and
   removing a particular characteristic from the component list once the component weighting factor for that particular characteristic is below a threshold.

17. The computer-readable medium as in claim 16, wherein adding comprises:
   adding the new characteristics to a candidate component list;
   assigning a component weighting factor to the new characteristics within the candidate component list;
   adjusting the component weighting factor within the candidate component list over time; and
   adding a particular new characteristic to the candidate list once the component weighting factor for that particular new characteristic is above a threshold.

18. The computer-readable medium as in claim 15, wherein the process further comprises:
   classifying the plurality of computer networks into groups of similar computer networks based on the component list and component weighting factor for each characteristic within the component list.

19. The computer-readable medium as in claim 15, wherein the process further comprises:
   determining a ranking of the characteristics within the component list according to associated component weighting factors; and
   providing an indication of the ranking for display.

20. An apparatus, comprising:
   one or more network interfaces configured to communicate in a computer network;
   a processor coupled to the network interfaces and adapted to execute one or more processes; and
   a memory configured to store a process executable by the processor, the process when executed operable to:
      maintain a component list of a plurality of measurable computer network characteristics for a plurality of computer networks;
      assign, by a machine learning process executed by the processor, a component weighting factor to each characteristic within the component list; and
      dynamically adjust, by the machine learning process, the component weighting factor within the component list for each particular characteristic over time based at least in part on a measurable effect that particular network characteristic has over one or more networks of the plurality of computer networks in response to a change to that particular characteristic wherein a resulting adjusted weighted component list is the most relevant components that characterize the one or more networks of the plurality of computer networks at a given point in time.

* * * * *

UNITED STATES PATENT AND TRADEMARK OFFICE
CERTIFICATE OF CORRECTION

PATENT NO. : 10,454,776 B2  
APPLICATION NO. : 15/492927  
DATED : October 22, 2019  
INVENTOR(S) : Matthew H. Birkner et al.

It is certified that error appears in the above-identified patent and that said Letters Patent is hereby corrected as shown below:

On the Title Page (73), Assignee, please replace as shown:
(73) Assignee: Cisco Technology, Inc., San Jose, CA (US)

In the Specification

In Column 8, Line 14, please amend as shown:
weight of the primary and secondary component catego- In Column 14, Line 37, please amend as shown:
istic, wherein a resulting adjusted weighted compo- Signed and Sealed this  
Nineteenth Day of November, 2019

Andrei Iancu  
*Director of the United States Patent and Trademark Office*